United States Patent
Wentink et al.

(10) Patent No.: US 9,130,662 B2
(45) Date of Patent: Sep. 8, 2015

(54) SYSTEMS AND METHODS FOR MANAGEMENT OF WIRELESS CLIENTS

(75) Inventors: Menzo Wentink, Utrecht (NL); James Petranovich, La Jolla, CA (US)

(73) Assignee: CONEXANT SYSTEMS, INC., Irvine, CA (US)

( * ) Notice: Subject to any disclaimer, the term of this patent is extended or adjusted under 35 U.S.C. 154(b) by 109 days.

(21) Appl. No.: 13/443,849

(22) Filed: Apr. 10, 2012

(65) Prior Publication Data

US 2012/0195244 A1    Aug. 2, 2012

Related U.S. Application Data

(63) Continuation of application No. 11/931,172, filed on Oct. 31, 2007, now Pat. No. 8,155,139.

(60) Provisional application No. 60/876,036, filed on Dec. 20, 2006, provisional application No. 60/872,969, filed on Dec. 5, 2006, provisional application No. 60/857,247, filed on Nov. 7, 2006.

(51) Int. Cl.
  *H04J 3/02*    (2006.01)
  *H04B 1/713*   (2011.01)
  *H04W 74/00*   (2009.01)
  *H04W 16/06*   (2009.01)
  *H04W 72/14*   (2009.01)

(52) U.S. Cl.
  CPC .............. *H04B 1/713* (2013.01); *H04W 16/06* (2013.01); *H04W 72/14* (2013.01); *H04W 74/00* (2013.01)

(58) Field of Classification Search
  CPC ...... H04W 72/14; H04W 74/00; H04W 16/06
  USPC .......... 370/338, 346, 468, 331, 336, 349, 462
  See application file for complete search history.

(56) References Cited

U.S. PATENT DOCUMENTS

| | | | |
|---|---|---|---|
| 5,960,344 A * | 9/1999 | Mahany | 455/432.2 |
| 6,298,053 B1 * | 10/2001 | Flammer et al. | 370/349 |
| 6,674,738 B1 | 1/2004 | Yildiz et al. | 370/338 |
| 6,980,535 B2 | 12/2005 | Bennett | 370/331 |
| 7,046,650 B2 | 5/2006 | Sherman | 370/338 |
| 7,123,627 B2 | 10/2006 | Kowalski | 370/468 |
| 7,251,235 B2 * | 7/2007 | Wentink | 370/338 |
| 7,307,976 B2 * | 12/2007 | Backes et al. | 370/338 |
| 7,343,162 B2 | 3/2008 | Tandai et al. | 455/450 |
| 7,418,004 B2 * | 8/2008 | Chou | 370/449 |
| 7,443,822 B2 | 10/2008 | Lindskog et al. | 370/338 |
| 7,450,550 B2 | 11/2008 | Jin | 370/338 |

(Continued)

OTHER PUBLICATIONS

PCT International Search Report, Apr. 10, 2008.

*Primary Examiner* — Ricky Ngo
*Assistant Examiner* — Dewanda Samuel
(74) *Attorney, Agent, or Firm* — Haynes and Boone, LLP

(57) ABSTRACT

Systems and methods for band hopping and power conservation in a wireless network are described. At least one embodiment is directed a method of hopping channels by a device within a wireless network. The method comprises hopping from a first channel to a target channel, resetting a virtual carrier sense after hopping to the target channel to enable service on the target channel, waiting for a pre-determined period of time, and setting a virtual carrier sense on the target channel after expiration of the pre-determined period of time and prior to hopping to a next target channel.

20 Claims, 16 Drawing Sheets

(56) References Cited

U.S. PATENT DOCUMENTS

| | | |
|---|---|---|
| 7,489,674 B2 * | 2/2009 | Kim .................... 370/348 |
| 7,693,525 B2 | 4/2010 | Fujiwara .................... 455/447 |
| 7,701,962 B2 * | 4/2010 | Utsunomiya et al. ......... 370/445 |
| 7,873,018 B2 * | 1/2011 | Kakani .................... 370/338 |
| 7,912,032 B2 * | 3/2011 | Zeng .................... 370/346 |
| 7,948,991 B1 * | 5/2011 | Hart et al. .................. 370/395.4 |
| 7,961,749 B2 * | 6/2011 | Lee et al. .................... 370/431 |
| 2004/0100929 A1 | 5/2004 | Garcia-Luna-Aceves .... 370/338 |
| 2004/0266351 A1 | 12/2004 | Chuah et al. .................... 455/62 |
| 2005/0124294 A1 * | 6/2005 | Wentink .................... 455/41.2 |
| 2005/0136833 A1 | 6/2005 | Emeott |
| 2006/0148534 A1 | 7/2006 | Shih |
| 2006/0165031 A1 | 7/2006 | Wang et al. |
| 2006/0252449 A1 | 11/2006 | Ramesh |
| 2007/0019664 A1 | 1/2007 | Benveniste .................... 370/445 |
| 2007/0037548 A1 * | 2/2007 | Sammour et al. .......... 455/343.2 |
| 2007/0041334 A1 * | 2/2007 | Song et al. .................... 370/254 |
| 2007/0042797 A1 | 2/2007 | Lee et al. .................... 455/509 |
| 2007/0097941 A1 * | 5/2007 | Le et al. .................... 370/341 |
| 2007/0115972 A1 * | 5/2007 | Jang et al. .................... 370/389 |
| 2007/0147284 A1 * | 6/2007 | Sammour et al. ............ 370/328 |
| 2007/0165665 A1 | 7/2007 | Gaur et al. .................... 370/445 |
| 2007/0201468 A1 * | 8/2007 | Jokela .................... 370/390 |
| 2009/0046673 A1 * | 2/2009 | Kaidar .................... 370/337 |

* cited by examiner

| 5 GHz    |          |         |     |     |     |         |         |     |        |     |
|----------|----------|---------|-----|-----|-----|---------|---------|-----|--------|-----|
| 2.4 GHz  | 591 μsec |         |     |     |     | 359 μsec|         |     |        |     |
|          |          | CFE     | backoff |     | CTS | switch  | CFE     | backoff | CTS | switch |
| dur      |          | 176     | 163 |     | 152 | 100     | 52      | 163 | 44     | 100 |
| tot time |          | 0       | 0   | 0   | 0   | 0       | 0       | 1   | 1      | 1   |

FIG. 9

| 5 GHz | | | | | | | 4361 μsec | | | | |
|---|---|---|---|---|---|---|---|---|---|---|---|
| 2.4 GHz | 4587 μsec | | | | | | | | | | |
| | CFE | bo/AMPDU | sifs/BA | pifs/CTS | switch | | CFE | bo/AMPDU | sifs/BA | pifs/CTS | switch |
| dur | 176 | 4096 | 44 | 171 | 100 | | 52 | 4096 | 44 | 69 | 100 |
| tot time | 0 | 4 | 4 | 4 | 4 | | 4 | 9 | 9 | 9 | 9 |

FIG. 10

| 5 GHz | 4847 μsec | | | | | | | 384 μsec | | | | |
|---|---|---|---|---|---|---|---|---|---|---|---|---|
| 2.4 GHz | CFE | sifs/AMPDU | sifs/BA | bo/AMPDU | sifs/BA | pifs/CTS | switch | CFE | backoff | | pifs/CTS | switch |
| | 176 | 4010 | 44 | 302 | 44 | 171 | 100 | 52 | 163 | | 69 | 100 |
| | 0 | 4 | 4 | 5 | 5 | 5 | 5 | 5 | 5 | 5 | 5 | 5 |

FIG. 11

SYSTEMS AND METHODS FOR MANAGEMENT OF WIRELESS CLIENTS

CROSS-REFERENCE TO RELATED APPLICATION

The present application is a continuation of U.S. Ser. No. 11/931,172, filed Oct. 31, 2007, entitled "SYSTEMS AND METHODS FOR MANAGEMENT OF WIRELESS CLIENTS" which is hereby incorporated by reference for all purposes.

This application claims priority to, and the benefit of, U.S. Provisional Patent Application entitled, "Client Power Save During AP Vacations (PSMP-to-Self)," having Ser. No. 60/857,247, filed on Nov. 7, 2006, U.S. Provisional Patent Application entitled, "Band Hopping," having Ser. No. 60/872,969, filed on Dec. 5, 2006, and U.S. Provisional Patent Application entitled, "Band Hopping," having Ser. No. 60/876,036, filed on Dec. 20, 2006, all of which are incorporated by reference in their entirety.

TECHNICAL FIELD

The present disclosure generally relates to wireless communications and more particularly relates to systems and methods for management of clients associated with an Access Point (AP).

BACKGROUND

Band hopping generally describes the feature in which a single 802.11 Access Point (AP) serves multiple networks on different channels while utilizing a single 802.11 radio. In this regard, the AP dynamically switches from one channel to another. Before leaving one channel, the AP sets a NAV (Network Allocation Vector) on the channel to postpone any uplink transmissions during its absence. The NAV can be set, for instance, by a CTS (Clear to Send) frame. One perceived shortcoming with this approach is that that no service is available on that particular channel while the NAV is set. Consequently, service is interrupted on the current channel when an AP hops to another channel.

Furthermore, a given AP usually stays on the channel associated with its BSS (Basic Service Set) and listens for possible transmissions directed at the AP. In some cases, however, the AP may have to temporarily vacate the channel in order to perform tasks which temporarily disable its capability to serve the BSS on that channel. In other cases, the channel may simply need to be cleared from transmissions altogether for other reasons. In such instances, the AP is considered to be in "vacation" mode. When in vacation mode, the AP generally sends a frame which sets a NAV for the duration of the vacation as setting the NAV prevents frames from being sent. One perceived shortcoming with this technique is that the clients are not able to enter a sleep mode as it is unknown how long the AP will remain in vacation mode. As such, the clients must be ready to receive frames at any time. It should be further noted that a 802.11 radio generally consumes as much power when it is in idle mode as when it is actively receiving frames from the AP. Accordingly, various needs exist in the industry to address the aforementioned deficiencies and inadequacies.

SUMMARY

Systems and methods for band hopping and power conservation in a wireless network are described. At least one embodiment includes a method of hopping channels by a device within a wireless network. The method comprises hopping from a first channel to a target channel, resetting a virtual carrier sense after hopping to the target channel to enable service on the target channel, waiting for a pre-determined period of time, and setting a virtual carrier sense on the target channel after expiration of the pre-determined period of time and prior to hopping to a next target channel.

Another embodiment comprises a device in the wireless network hopping from a first channel to a target channel based on a pre-defined hopping schedule and at least one wireless client hopping to the target channel as a result of the device hopping to the target channel, wherein the at least one wireless client is communicatively coupled to the device to form the wireless network.

Another embodiment comprises hopping from a first channel to a target channel, sending a frame to reinforce a virtual carrier sense in order to disable wireless service on the first channel, and hopping from the target channel back to the first channel.

Yet another embodiment includes a system for band hopping in a wireless network. The system comprises an Access Point (AP) configured to send a hop indication prior to hopping from a first channel to a target channel where the AP is configured to hop to the target channel upon sending the hop indication. The system further comprises at least one client configured to interpret the hop indication and hop to the target channel with the AP based on the hop indication. The at least one client is further configured to reset a Network Allocation Vector (NAV) for the first channel after hopping to the target channel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 provides an example of band hopping when there is no uplink traffic in both the 2.4 GHz and 5 GHz spectrum bands.

FIG. 10 provides an illustration of band hopping when uplink transmission begins in both channels within the scheduled backoff time.

FIG. 11 provides an illustration of band hopping where there is uplink and downlink traffic in the 2.4 GHz band.

DETAILED DESCRIPTION

Figure 1:
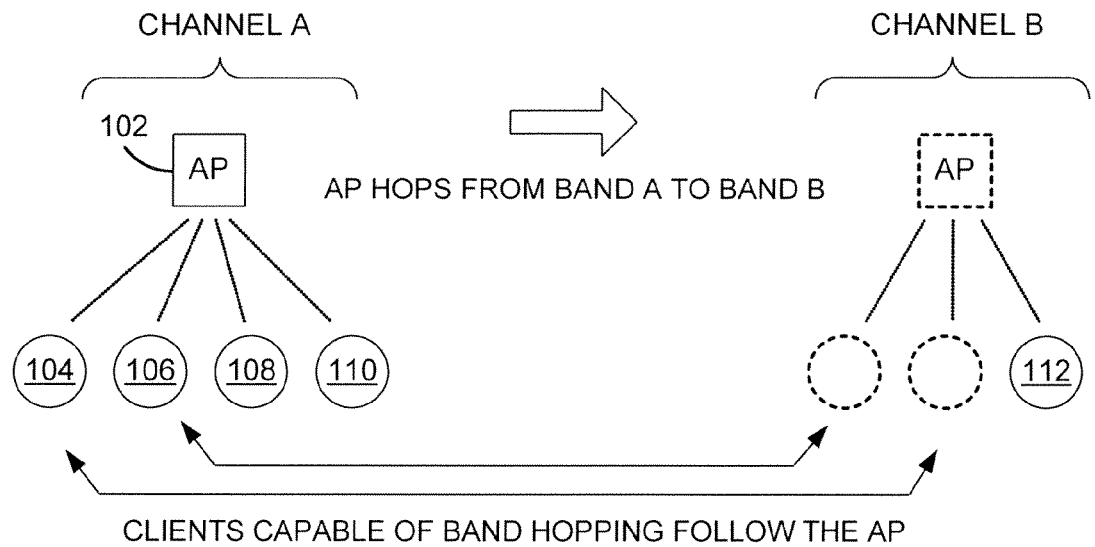
FIG. 1 depicts a top-level diagram of clients hopping bands in conjunction with an AP.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

The systems and methods described herein provide for Access Point (AP)/client management which offers band hopping and power savings capabilities. Generally, Access points (APs) refer to base stations within a wireless network that transmit and receive radio frequencies for wireless enabled devices or clients to communicate with. Wireless clients can be mobile devices that are equipped with a wireless network interface, for example. A Basic Service Set (BSS) defines a set of clients that can communicate with each other. Every BSS has an identification (ID) referred to as the BSSID, which comprises the MAC address of the AP servicing the particular BSS.

As described herein, the phrase "band hopping" describes the feature in which a single 802.11 Access Point (AP) serves multiple networks on different channels utilizing a single radio. In this regard, the AP dynamically switches from one channel to another. Before leaving one channel, the AP sets a Network Allocation Vector (NAV) on the channel to postpone any uplink transmissions during its absence. As such, service ceases on that particular channel. As known by those skilled in the art, the Network Allocation Vector relates to a method for avoiding collisions in a shared transmission medium. Generally, for 802.11, the NAV can be reset by the AP through the transmission of a Contention Free End (CF-End) frame, but for 802.11n, clients are also allowed to reset a NAV by transmitting a CF-End frame. This methodology is referred to as a LongNAV and NAV truncation. A NAV is first set for some long duration of time and subsequently reset by the transmission of a CF-End when no more pending frames are left.

Systems and methods are described where clients follow an AP when the AP hops to another channel so that service can be continued without interruption. Several exemplary embodiments will be described in which clients interpret hop indications and hop channels in conjunction with the AP. As a non-limiting example, this can comprise switching channels immediately after receiving a hop indication and resetting a NAV after switching to a new channel.

The AP may send a hop indication before hopping to another channel. The hop indication may include information about the next channel as well as a maximum switch time. For some embodiments, a set of available channels may be predefined. The AP switches to one of these channels upon sending a hop indication. For some embodiments, duplicate hop indications are sent to ensure receipt by the clients. For other embodiments, the hop indication includes a local sequence number and a time instance or interval in which the switch will occur.

Other exemplary embodiments include clients that interpret a "hop schedule" in order to hop in conjunction with the AP. This comprises switching channels when the hopping schedule indicates that the AP will switch channels and resetting a NAV after switching to a new channel. For such embodiments, a Broadcast Probe Response (BPR) is sent after hopping to a new channel. Furthermore, a CF-End is sent after hopping to a new channel. A Network Allocation Vector (NAV) may be defined such that it expires when the time reaches the sum of the Target Hop Time and the Maximum Switch Time (i.e., THT+MST). Furthermore, in other embodiments, the AP may be provisioned to switch channels every 10 ms.

The AP generally maintains the same BSSID when hopping across multiple channels. However, the AP may also work in combination with other BSSIDs. Further, the AP may periodically set a NAV on one channel and switches to another channel to reinforce a NAV and transmits a BPR during this time. To reinforce the NAV, a CTS or a BPR is sent. For some embodiments, attempts may be made to send the BPR every 10 ms.

Reference is now made to FIG. 1, which depicts a top-level diagram of clients hopping bands in conjunction with an AR FIG. 1 shows an AP 102 in channel A with various associated clients 104, 106, 108, 110. The AP 102 then hops or switches to another channel (channel B). In accordance with exemplary embodiments described herein, clients capable of band hopping follow the AP to channel B such that service is uninterrupted. For the illustration shown in FIG. 1, clients 104, 106 "hop" to channel B while the remaining legacy clients 108, 110 (not capable of band hopping) remain associated with channel A. For purposes of nomenclature used herein, a client capable of following an AP is referred to as a band hopping client.

Systems and methods described herein provide several approaches to incorporating band hopping clients in a band hopping architecture. Two approaches include a scheduled and an unscheduled approach to band hopping. For embodiments involving unscheduled band hopping, the AP indicates in real time that it is about to switch to a new channel by sending a frame (or information element) referred to as a hop indication. The hop indication signals that the AP will hop to a new channel. The AP may be configured to hop immediately after the end of the frame, for instance. Further, the hop indication can contain information about the new channel such as the frequency band, channel number, channel width, country information element, regulatory extension identifier, regulatory class, coverage class, maximum switch time, etc. Associated band hopping clients that receive the hop indication will then switch to the indicated channel where they will continue to communicate with the AP and vice versa.

The hop indication is a broadcast frame, which is not acknowledged. It is therefore possible that in some circumstances, clients may miss the hop indication and consequently miss a hop by the AP. Besides using a scheduled solution, another solution is to send two or more hop indication frames, with a local sequence number in addition to a hop time, so that even when a client receives just one hop indication, it will know that and when the hop occurs. Some of the redundant hop indications may be sent at a higher rate to increase efficiency. A local sequence number may be used as the same sequence numbers are used for each set of hop indications which are transmitted prior to a hop. The timing for the hop can be relative to the end of the frame, or it can be expressed relative to the TSF (Timing Synchronization Function).

Figure 2:
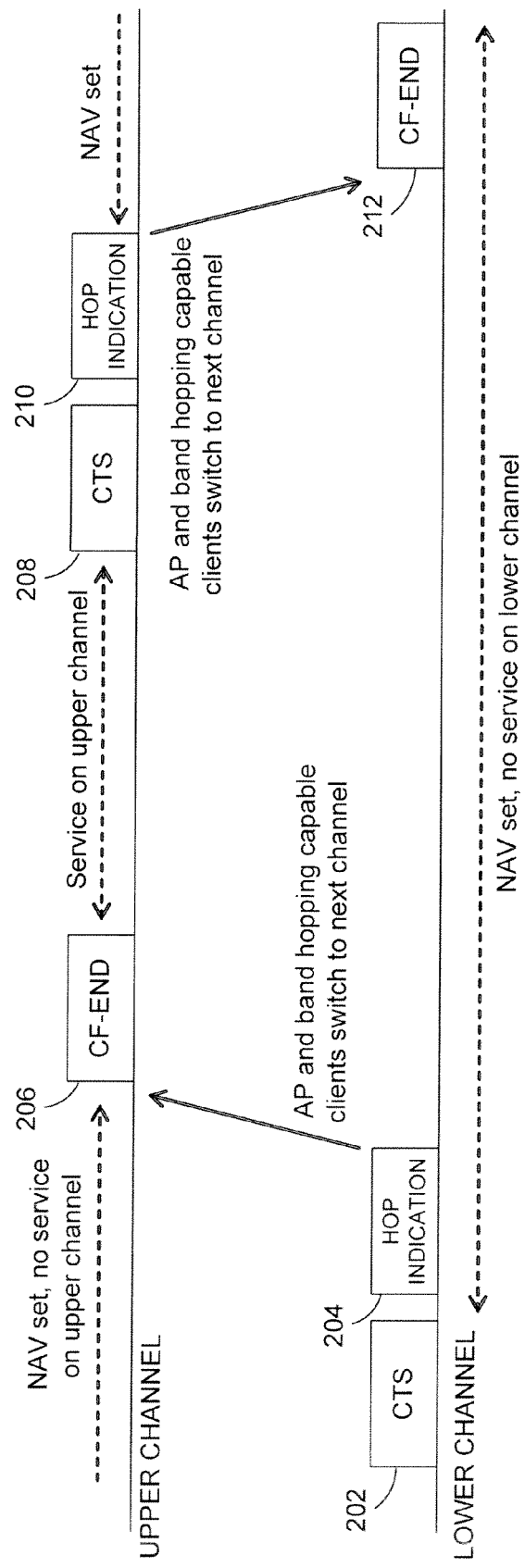
FIG. 2 depicts a signal flow diagram illustrating one embodiment of how the band hopping clients depicted in FIG. 1 transition to a new channel.

Reference is now made to FIG. 2, which depicts a signal flow diagram illustrating one embodiment of how the band hopping clients depicted in FIG. 1 transition to a new channel. In particular, FIG. 2 depicts examples of frame transmissions by a AP prior to and after band hopping occurs. In the non-limiting example shown, the AP opens the next channel by sending a short frame such as a CF-End frame, for instance. The CF-End frame also unlocks the NAV on the target channel. It should be noted that these transmissions are applicable to both hopping and non-hopping clients.

As shown in FIG. 2, a CTS 202 followed by a hop indication 204 is sent by the AP on the lower channel. At this point, the NAV is set on the lower channel and service ceases on that channel. The AP 102 depicted in FIG. 1 then proceeds to hop to the upper channel. Clients that receive the hop indication and that are capable of band hopping follow the AP to the upper channel. A CF-End frame is generated, thereby initiating service on the upper channel. When the AP is ready to hop to another channel (e.g., back to the lower channel), the AP generates another CTS 208 followed by a hop indication 210. At this point, the NAV is set on the upper channel and service ceases on the upper channel. The AP (and all band hopping clients) then transition to the new channel (i.e., back to the lower channel). The AP then generates a CF-End frame upon transitioning to the lower channel to re-enable service.

Figure 3:
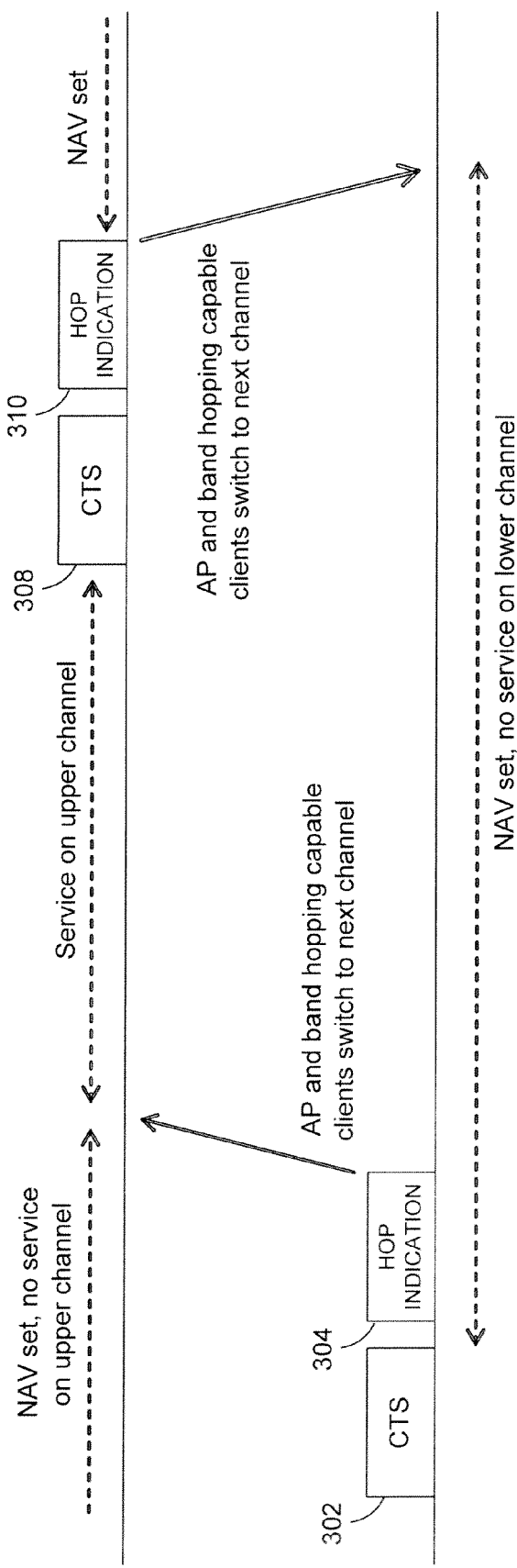
FIG. 3 depicts an embodiment for unscheduled band hopping for the AP and clients depicted in FIG. 1.

Reference is made to FIG. 3, which depicts an embodiment for unscheduled band hopping for the AP and clients depicted in FIG. 1. The transmission of an opening frame (i.e., CF-End signal) is not required for embodiments in which the AP returns to a channel where the NAV is about to expire anyway. As depicted in FIG. 3, a CTS signal 302 is generated followed by a hop indication 304. A NAV is also set, thereby ceasing service on the current channel. Next, the AP and clients capable of band hopping switch to the new channel. At about the same time, service is enabled on the new channel due to expiration of the NAV. Prior to switching channels, the AP issues another CTS 308 followed by a hop indication 310 and proceeds to hop channels.

Figure 4:
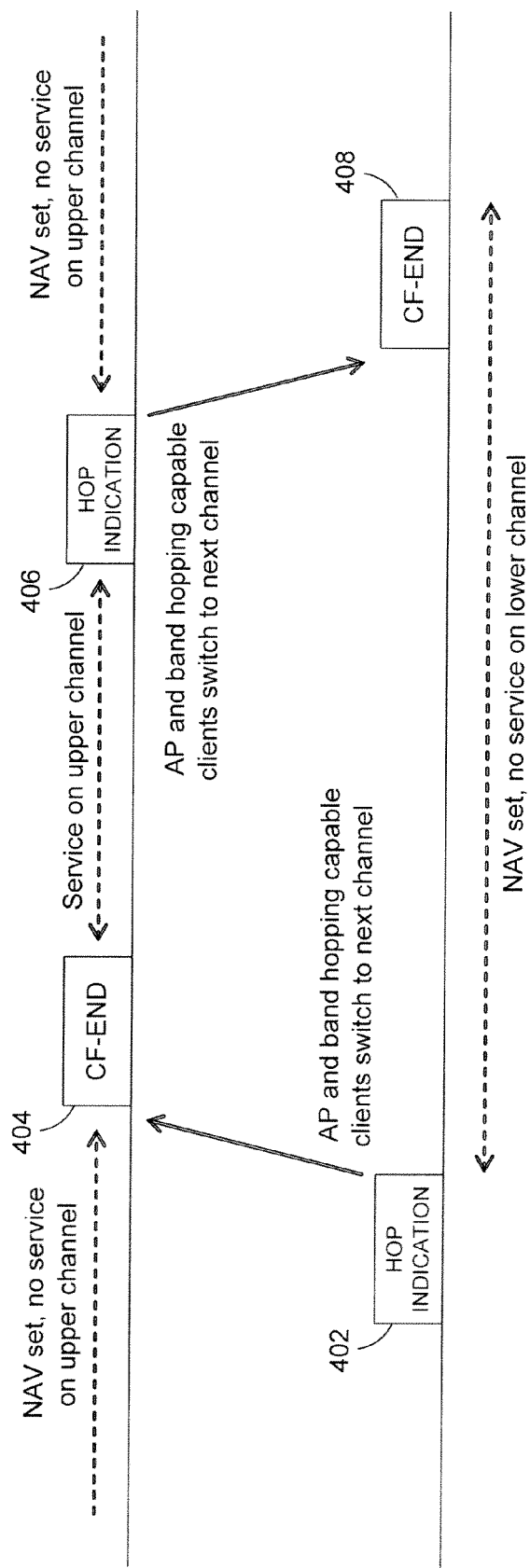
FIG. 4 depicts an embodiment for band hopping where the hop indication is used to set a NAV.

In yet another embodiment, the hop indication frame may be used to set a NAV on the current channel, thereby avoiding the need to transmit a separate CTS signal. This is illustrated in FIG. 4. Once a hop indication 402 is generated, the AP and corresponding clients capable of band hopping switch to the new channel. As CF-End signal 404 is generated and service is enabled on the new channel. When the AP is ready to hop to another channel, another hop indication 406 is transmitted. The AP and corresponding clients within the current channel hops to the next channel. A CF-End signal 408 is generated, and service commences on the channel. The transmission of a CF-End signal 408 is not always required, as shown in FIG. 3.

In general, clients that are capable of following a hopping AP convey this to the AP during the association phase so that the AP knows that it can continuously send traffic to these clients regardless of whether the AP hops to another channel. It should be noted that in this regard, service remains uninterrupted. Furthermore, in exemplary embodiments, the AP advertises that it is a band hopping AP. During the association phase, band hopping clients may also send a supported channel set to the AP which the AP can then use to select channels for switching purposes. Likewise, the set of channels in which the AP hops between may be pre-determined and signaled to the client in an off-line fashion. The hop indication for these particular embodiments is then used to indicate that the AP will simply be hopping to the next channel in the set. Accordingly, there is no need for additional information about the channel. It should be noted that this simplifies the hop indication and ultimately increases the reliability of the frame as the hop indication is a broadcast frame and no acknowledgments are sent.

For embodiments involving scheduled band hopping, the hopping schedule may be pre-defined in an indefinite (i.e., repetitive) fashion or pre-defined only for a certain number of hops. That is, a hopping schedule (generally contained in an information element) may be defined according to either a repetitive hopping schedule (with fixed hopping intervals) or for only a certain number of hops. In some embodiments, the hopping schedule may be transmitted periodically, for instance, as part of a beacon or as part of a multicast/broadcast frame. The hopping schedule may also be transmitted at the discretion of the AP in a separate frame altogether. For scheduled band hopping, the AP must still transmit a CTS prior to hopping and set a NAV on the current channel (i.e. for those stations which will stay on the current channel). The advantage of scheduled band hopping is that it improves the reliability of the system with respect to missed hop indications (which are unacknowledged frames). The hopping schedule information element can be included in the beacon or it can be transmitted inside a separate broadcast management frame which is transmitted after each DTIM (Delivery Traffic Indication Map) beacon. Clients in a scheduled band hopping scheme may automatically reset a NAV on a new channel so that the AP does not need to send a CF-End each time it hops channels.

Figure 5:
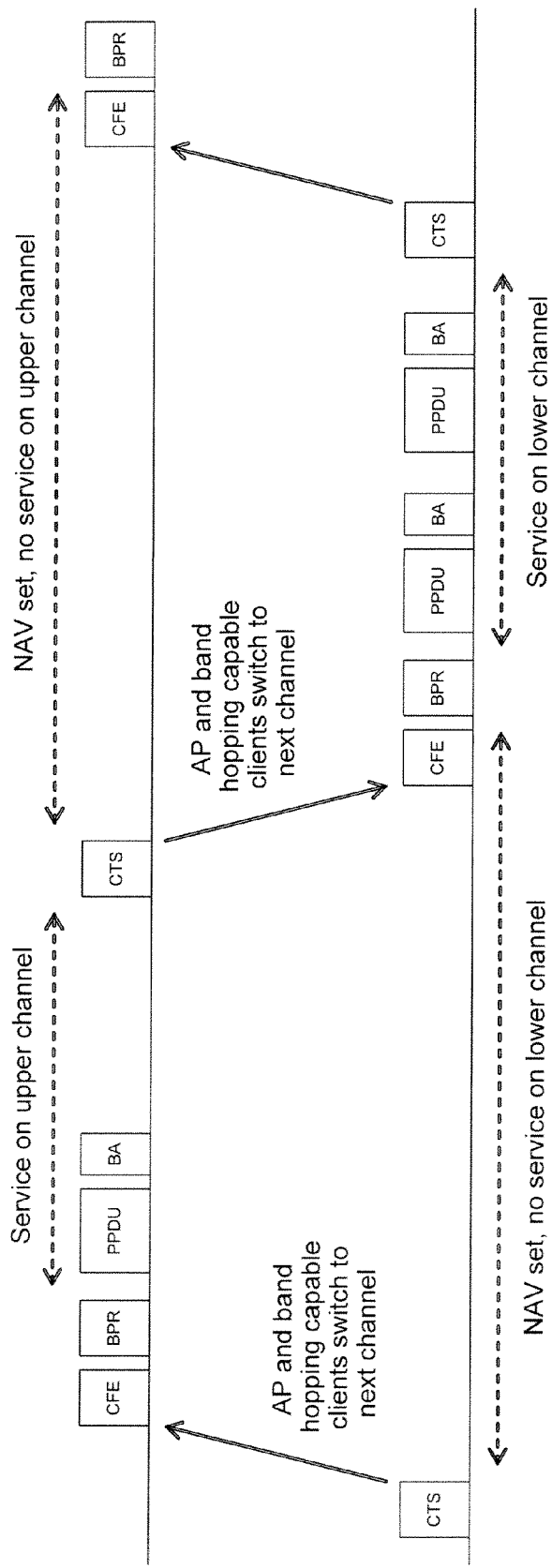
FIG. 5 depicts an embodiment for incorporating a fixed hopping schedule.

In some embodiments, the AP may be configured to hop channels every 10 ms. The target hop time (THT) defines the time at which the AP is scheduled to hop. This target hop time can be timed based on the target beacon transmission time (TBTT). As such, band hopping clients will hop to the new channel each THT time interval, and any backoff continues after the pre-defined maximum switch time (MST). The AP ensures that the NAV on the other channel ends exactly at this time (i.e., after THT+MST) to ensure fairness with respect to access time between legacy clients and band hopping clients on the next channel. Once an AP hops to a new channel, the AP sends a probe response to the broadcast address (BPR). An example of a fixed hopping schedule scheme is shown in FIG. 5.

Figure 6:
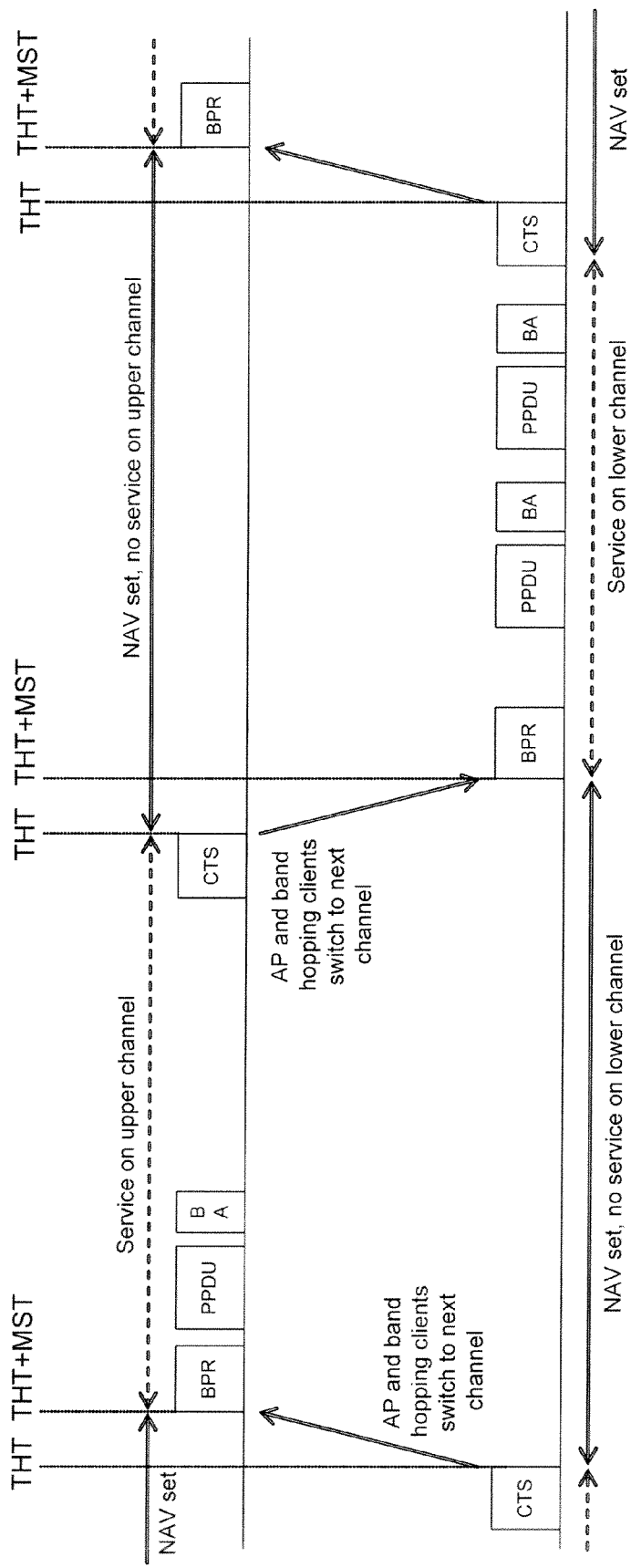
FIG. 6 depicts an alternative embodiment for incorporating a fixed hopping schedule.

Reference is now made to FIG. 6, which depicts an alternative embodiment for incorporating a fixed hopping schedule. In the non-limiting example shown, a fixed hopping schedule is implemented in addition to precise setting of the NAV so that no CF-End is required. The THT parameter may be utilized to indicate the time at which service resumes on a new channel rather than to indicate a maximum switch time. Each hopping client must start switching early enough to resume backoff at time interval THT. The AP may set a NAV that ends at the next THT (or at THT+MST, depending on the implementation) so that no CF-End must be transmitted when the AP arrives on the new channel. If the first frame the AP sends is a BPR, then the NAV may be scheduled to end just before or just after the BPR transmission.

Figure 7:
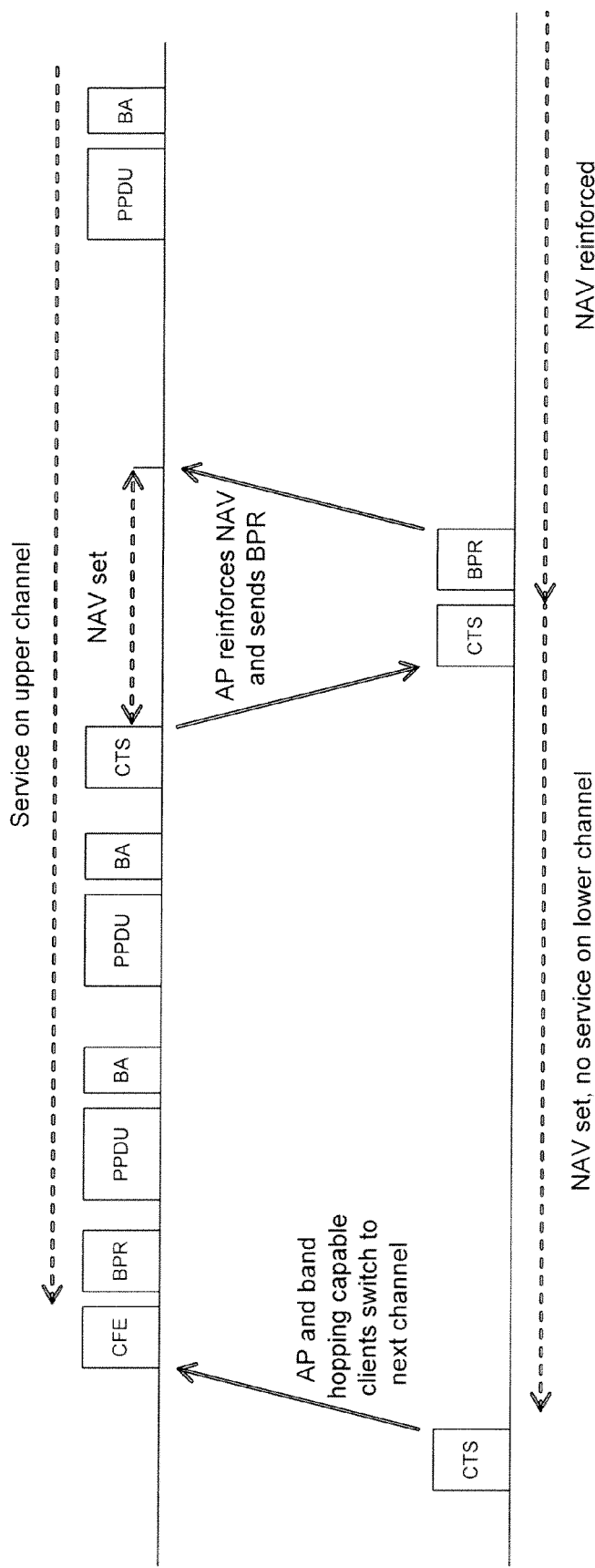
FIG. 7 illustrates an embodiment for scheduled band hopping involving NAV reinforcement and BPR transmission.
Figure 8:
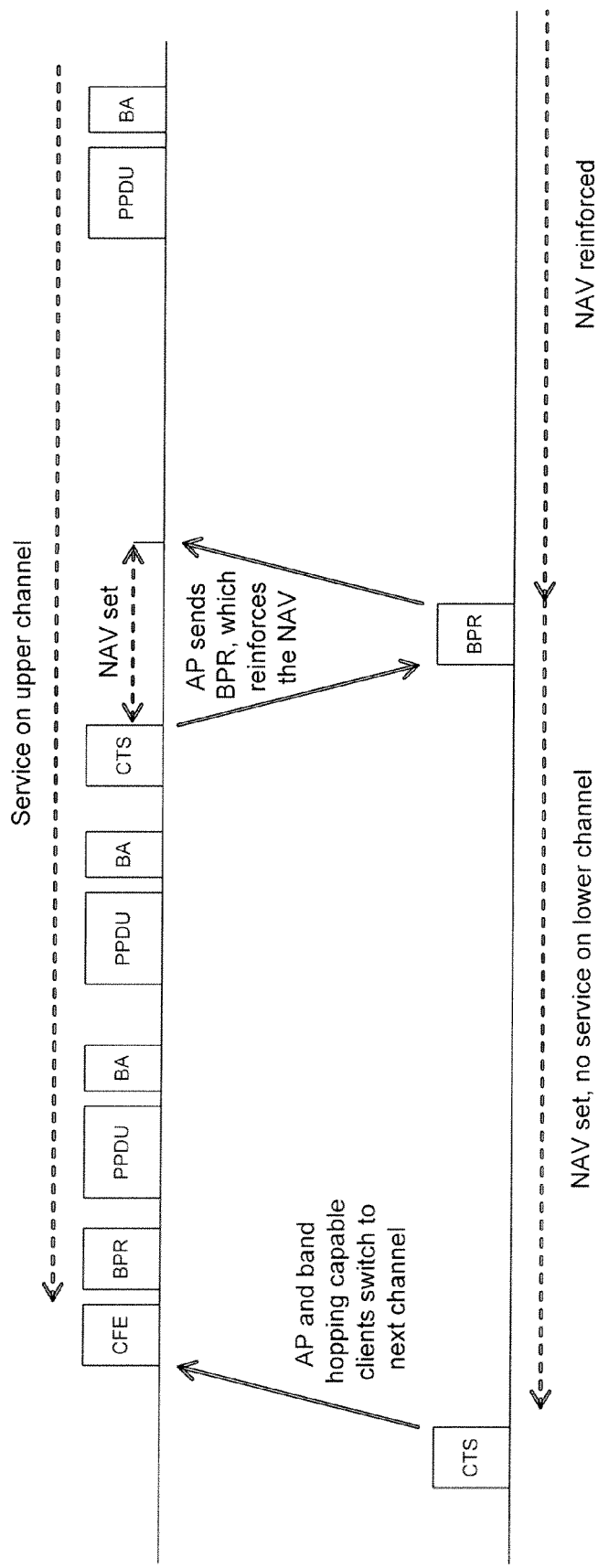
FIG. 8 illustrates yet another embodiment for scheduled band hopping involving NAV reinforcement and BPR transmission.

Reference is now made to FIG. 7, which illustrates an embodiment for scheduled band hopping involving NAV reinforcement and BPR transmission. In a scheduled hopping implementation, the AP may elect to stay on a particular channel longer than 10 ms. In order to avoid issues on the channel not currently being served by the AP, the AP reinforces the NAV and send a BPR on the other channel at least once every 10 ms (approximately). In this regard, the AP sets a short NAV on the channel that is being serviced and then switches to the other channel (e.g., the lower channel) and reinforces the NAV by sending a CTS and a BPR. FIG. 8 illustrates yet another embodiment for scheduled band hopping involving NAV reinforcement and BPR transmission. In the non-limiting example shown, the BPR is utilized to reinforce the NAV. In yet another embodiment, the AP may specify a PHY duration rather than specify a NAV to temporarily block a channel.

For embodiments incorporating a scheduled hopping scheme, a fixed hopping schedule can be less efficient when non-band hopping clients are present because a fixed schedule introduces inefficiencies when the load on each channel is different. For example, when a channel is empty, the AP will remain on the channel irrespective of whether clients are transmitting or not. It should be noted that the presence of band hopping clients alleviates this perceived inefficiency as these clients are capable of communicating with the AP all the time. As an example, a fixed hopping schedule can potentially reduce the throughput for non-band hopping clients by approximately 50% (with respect to available airtime) for a hopping schedule with a 50% duty cycle, irrespective of the medium usage on the other channel.

For exemplary embodiments of a band hopping scheme, the AP provides the same BSSID on each channel it hops to. An AP generally broadcasts its SSID via packets that are called beacons. While there is no need to send a copy of the beacon and MC/BC traffic (referred to as the broadcast information) for a specific SSID on each channel, this step is not necessarily excluded. In such cases, band hopping clients must be prepared to handle duplicate broadcast information. A similar requirement currently exists for the dual beacon feature as defined in the specification for 802.11n, draft 0.4. When beacon and BM traffic are repeated, a band hopping client should select one channel on which to receive beacons in addition to MC/BC traffic and ignore this information when received on other channels. The advantage of this method is that the AP can work with the same BSS on all channels. However, the drawback is added complexity for repeating the broadcast information.

Exemplary embodiments for band hopping takes place between the 2.4 GHz and 5 GHz bands. Legacy clients which are not capable of band hopping may associate with the AP in either band. Band hopping capable clients will have higher throughput and lower latency (or jitter), while the AP may continue serving legacy clients (i.e., non band hopping capable clients) in multiple bands in parallel.

If the AP sets a NAV prior to hopping to the next channel, then the AP should use a CF-End frame on the next channel to unlock the NAV for band hopping clients in the event the AP arrives at the channel prior to expiration of the NAV. The use of a CF-End frame can be avoided by incorporating a scheme where band hopping clients maintain virtual carrier sense for each channel separately. Alternatively, band hopping clients can automatically reset any NAV when hopping to a new channel.

Having described various embodiments for band hopping, various band hopping scenarios are now discussed for purposes of illustration. Reference is made to FIG. 9, which provides an example of band hopping when there is no uplink traffic in both the 2.4 GHz and 5 GHz bands. Duration is measured in microseconds while total time is measured in milliseconds. The top portions indicate the total time (in μsec) in which the AP stays within the particular band or channel.

As depicted in FIG. 9, the AP arrives in the 2.4 GHz band where it remains for 591 μsec. The CFE transmission unlocks the channel, after which the AP waits for 163 μsec. This time period is equal to the DIFS (Distributed Coordination Function Interframe Space) period plus 15 slots of backoff. After the backoff period, the AP sends a CTS and switches back to the 5 GHz band at which time the procedure repeats. The AP stays on the 5 GHz channel for a duration of 359 μsec. It should be noted that this is shorter than the time the AP resides in the 2.4 GHz band because the AP can utilize OFDM (Orthogonal Frequency Division Multiplexing) for CFE and CTS transmissions in the 5 GHz band rather than CCK (Complementary Code Keying), which is used in the 2.4 GHz band. The 15 slots of backoff are used as an example and is based on the typical backoff window of 15 slots (the typical value for CWmin for Best Effort traffic). Each CTS contains a duration value which is sufficiently long to cover the expected maximum time duration the AP will be away from the channel.

FIG. 10 provides an illustration of band hopping when uplink transmission begins in both channels within the scheduled backoff time. The TXOP (Transmit Opportunity) in the non-limiting example shown consists of an AMPDU (Aggregated MAC Protocol Data Unit) followed by a BA (Block ACK). After the TXOP, the AP sends a CTS and returns to the other channel. The CTS that blocks the channel is sent a PIFS (Point Coordination Function Inter-Frame Space) period after the end of the TXOP. Downlink traffic may be transmitted by the AP either before or after unlocking the new channel, but doing so before the channel is unlocked will reduce the amount of contention on the channel and thus the number of collisions.

FIG. 11 provides an illustration of band hopping where uplink and downlink traffic is both present in the 2.4 GHz band. In order to prioritize one channel over another channel, the AP may differentiate the number of backoff slots counted on each channel. For instance, the AP may be configured to count a maximum of 5 slots of backoff per visit on the channel in the 2.4 GHz band while it counts a maximum of 15 slots of backoff on the channel in the 5 GHz band. The effect will be that the channel where more backoff slots are counted will be able to start more TXOPs. Backoff on the channel with less priority may become interrupted by multiple instances in which the AP locks the channel and services another channel.

Another option for differentiation between the channels is to limit the total time spent on each channel. This method can be used in combination with backoff differentiation. When switching to the lower priority channel, the AP may also simply send a CTS reinforcement frame after PIFS without any additional backoff. Such a CTS reinforcement frame will synchronize new stations to the current virtual carrier sense state on the channel. This may be advantageous, for instance, in the event a power save station woke up during the AP's absence, or for stations which are trying to authenticate.

The AP can send a CTS PIFS time after each TXOP (and switch to the other channel), or it can count a fixed total number of backoff slots on each channel, in which case more backoff slots may occur between a TXOP and the next CTS such that multiple TXOPs may occur without an intermediate channel switch. This method is similar to scheduling the CTS a fixed number of backoff slots (for instance, 15 slots) after the CFE, instead of PIFS after a TXOP. The AP may also cap the maximum time spent on a single channel in combination with the method described above. The transmission of the CTS may also be scheduled after a fixed amount of time (i.e., a time on the order of several backoff slots). If a TXOP starts within this time, the transmission of the CTS is postponed until PIFS after the end of this TXOP.

Scanning clients may have difficulty discovering a band hopping AP when the Probe Request is transmitted during the AP's absence. The scanning client will not receive a Probe Response in this case. Various embodiments address this by periodically transmitting a Probe Response to the Broadcast address (BPR). In particular, the Probe Response is transmitted more often than the Beacon (i.e., on the order of every 10 msec). Typically, scanning clients wait for a period of 10 msec to receive Probe Responses in response to the Probe Request. The AP may send a DSSS Probe Response which includes typical BSS parameters. In addition, the AP may send OFDM or HT Probe Response which may contain a broader set of parameters. The non-DSSS Probe Response transmissions require less air time.

Another issue that clients might experience with a band hopping AP occurs when an Authentication Request is transmitted during the AP's absence from a particular channel. However, this issue is addressed by limiting the time an AP resides on another channel to a time which is less than the total time it takes for a station to exhaustively retransmit the Authentication Request frame. If the AP returns before this time, the station will become synchronized with the (virtual) carrier sense on the channel and the next retransmission will occur at a time when the AP is present on the channel (i.e., after it has unlocked the NAV using a CF-End frame). A typical retry limit for Authentication Requests is 8 times, which implies that the frame would be transmitted a total of 9 times. The backoff window will double between retransmissions, and will start at 15 or 31 slots, with a slot time of 9 or 20 us (for 5 and 2.4 GHz band, respectively). The worst-case average times for exhaustive retransmission of the mentioned frames are shown in the tables below. In other words, the time between subsequent visits should be 167 msec for the 2.4 GHz band and 37 msec for the 5 GHz band.

TABLE 1

Total time for exhaustive retransmission of a unicast frame in 5 GHz band.

| Try | CW | Average Backoff (9 us slots) | Average Backoff (us) | Tx duration 6 Mbps (us) | Total (us) |
| --- | --- | --- | --- | --- | --- |
| 1 | 15 | 8 | 68 | 48 | 116 |
| 2 | 31 | 16 | 140 | 48 | 303 |
| 3 | 63 | 32 | 284 | 48 | 635 |
| 4 | 127 | 64 | 572 | 48 | 1254 |
| 5 | 255 | 128 | 1148 | 48 | 2450 |
| 6 | 511 | 256 | 2300 | 48 | 4797 |
| 7 | 1023 | 512 | 4604 | 48 | 9449 |
| 8 | 2047 | 1024 | 9212 | 48 | 18708 |
| 9 | 4095 | 2048 | 18428 | 48 | 37184 |
| sum | 8167 | 4084 | 36752 | 432 | |
| Total | 37 ms | | | | |

TABLE 2

Total time for exhaustive transmission of a unicast frame in the 2.4 GHz band.

| Try | CW | Average Backoff (20 us slots) | Average Backoff (us) | Tx duration 1 Mbps (us) | Total (us) |
| --- | --- | --- | --- | --- | --- |
| 1 | 31 | 16 | 310 | 352 | 662 |
| 2 | 63 | 32 | 630 | 352 | 1644 |
| 3 | 127 | 64 | 1270 | 352 | 3266 |
| 4 | 255 | 128 | 2550 | 352 | 6168 |
| 5 | 511 | 256 | 5110 | 352 | 11630 |
| 6 | 1023 | 512 | 10230 | 352 | 22212 |
| 7 | 2047 | 1024 | 20470 | 352 | 43034 |

TABLE 2-continued

Total time for exhaustive transmission of a unicast frame in the 2.4 GHz band.

| Try | CW | Average Backoff (20 us slots) | Average Backoff (us) | Tx duration 1 Mbps (us) | Total (us) |
| --- | --- | --- | --- | --- | --- |
| 8 | 4095 | 2048 | 40950 | 352 | 84336 |
| 9 | 8191 | 4096 | 81910 | 352 | 166598 |
| sum | 16343 | 8172 | 163430 | 3168 | |
| Total | 167 ms | | | | |

The AP may periodically return to a previous channel to send a Broadcast Probe Response, a reduced beacon, or even a full beacon, and/or a CTS. The AP does not need to truncate the NAV on the channel, but only transmits a NAV reinforcement frame (i.e., a CTS signal) or broadcast discovery frame (i.e., a Probe Response). The time between the intermediate signals is such that a transmitting station on the other channel will not have exhausted its retransmissions for the frame. In practice, this implies that the intermediate signals must be transmitted with a 4-20 ms period. Prior to switching to the other BSS for transmitting the intermediate signals, the AP sets a NAV in the current BSS, possibly by way of sending a CTS frame. The duration value may be an estimated off time so that truncation by means of CF-End is not required when the AP returns after sending the intermediate signals. In other words, the AP may not unlock a channel for a prolonged period of time, but it does periodically transmit CTS signals, Probe Responses, Beacons, and MC/BC traffic on that channel.

If the AP has to return to the other channel every 12 ms (or faster), this implies that there may not be sufficient time to transmit a regular TCP packet at the 1 Mbps PHY rate (the lowest DSSS PHY rate available in the 2.4 GHz band). This also implies that the use of this rate may be limited so that the range of the BSS is reduced. The reduced probability of missing a Probe or Authenticate Request due to truncating of long transmissions must be weighed against each other.

When the AP notes that a transmission starts which takes longer than the maximum time the AP will reside on the channel (which may be deduced from the length and rate information from the PHY header), the AP may switch to another channel and provide service during this time. The channel it leaves will be kept occupied by the transmission that just started. The AP must ensure in this case that it returns before the oversized transmission ends. In order to ensure this, the AP may not unlock the other channel and restrict itself to the transmission of intermediate signals. The BSS in the 2.4 GHz band may have 20 MHz channel width, while the BSS in the 5 GHz band is 40 MHz wide. The AP may send different beacons on each channel, in which different capabilities are advertised.

Exemplary systems and methods described herein further provide for a management scheme that includes a power saving scheme while the AP is in "vacation" mode. An AP within a wireless local area network (WLAN) usually stays on the channel associated with its BSS and monitors for transmissions directed at the AP. In certain instances, however, the AP might have to temporarily vacate the channel to scan other channels or to simply perform tasks which temporarily disable it's capability to serve the BSS on the current channel. In other instances, transmissions on the channel might be halted for other reasons. In such instances, the AP is considered to be in "vacation" mode.

Systems and methods are described herein where an AP transmits a special frame prior to entering vacation mode. The special frame specifies the duration in which the AP will be inaccessible. During these time periods, the clients can take advantage of this information and temporarily switch off their receivers to save power. As such, exemplary embodiments comprise an access point configured in a listen mode on a channel. The access point is further configured to temporarily vacate the channel and perform tasks that temporarily disable the access point to clear the channel for other tasks.

Exemplary embodiments utilize the PSMP (Power Save Multi Poll) frame as defined in the 802.11n draft specification, herein incorporated by reference in its entirety. The table below illustrates the format for the PSMP management action field.

TABLE 3

Format of the PSMP Management Action Field

| Order | Information | Name | Value |
|---|---|---|---|
| 1 | Category | HT | 7 |
| 2 | Action | PSMP | 2 |
| 3 | PSMP Parameter Set | | |
| 4 to (N_STA + 3) | STA Info Repeated N_STA times | | |

The PSMP frame contains a variable number of uplink and downlink times for specific stations. This is reflected in the STA Info field illustrated below.

TABLE 4

STA Info Filed Format

| B0-B7 TSIDs Set | B8-B23 STA_ID | B24-B34 PSMP-DTT Start Offset | B35-B42 PSMP-DTT Duration | B43-B53 PSMP-UTT Start Offset | B54-B63 PSMP-UTT Duration |
|---|---|---|---|---|---|
| 8 bits | 16 bits | 11 bits | 8 bits | 11 bits | 10 bits |

Stations can go to sleep (or enter vacation mode) outside their scheduled uplink and downlink times (if any were scheduled in the PSMP frame). The downlink and uplink times are referred to as PSMP-UTT (uplink transmission time) and PSMP-DTT (downlink transmission time), respectively. For purposes of clearing the channel for an AP vacation, the AP may send a PSMP frame without STA Info fields (i.e., where the N_STA value shown below is set to 0), or populate a STA Info field with an unknown AID (association identifier), or populate a STA info filed with its own AID (0), depending on the particular embodiment. For purposes of nomenclature used herein, this type of PSMP is referred to as "PSMP-to-self."

TABLE 5

PSMP Parameter Set Format

| N_STA | More PSMP | PSMP Sequence Duration |
|---|---|---|
| 5 bits | 1 bit | 10 bits |

Stations receiving a PSMP-to-self frame will not find any uplink or downlink time for them and assume that they can go to sleep during the entire PSMP Sequence Duration as specified in the PSMP Parameter Set in Table 5. Other embodiments incorporate either a new management frame, management action frame, control frame, or information element specifically for the purpose of indicating an AP vacation time.

Figure 12:
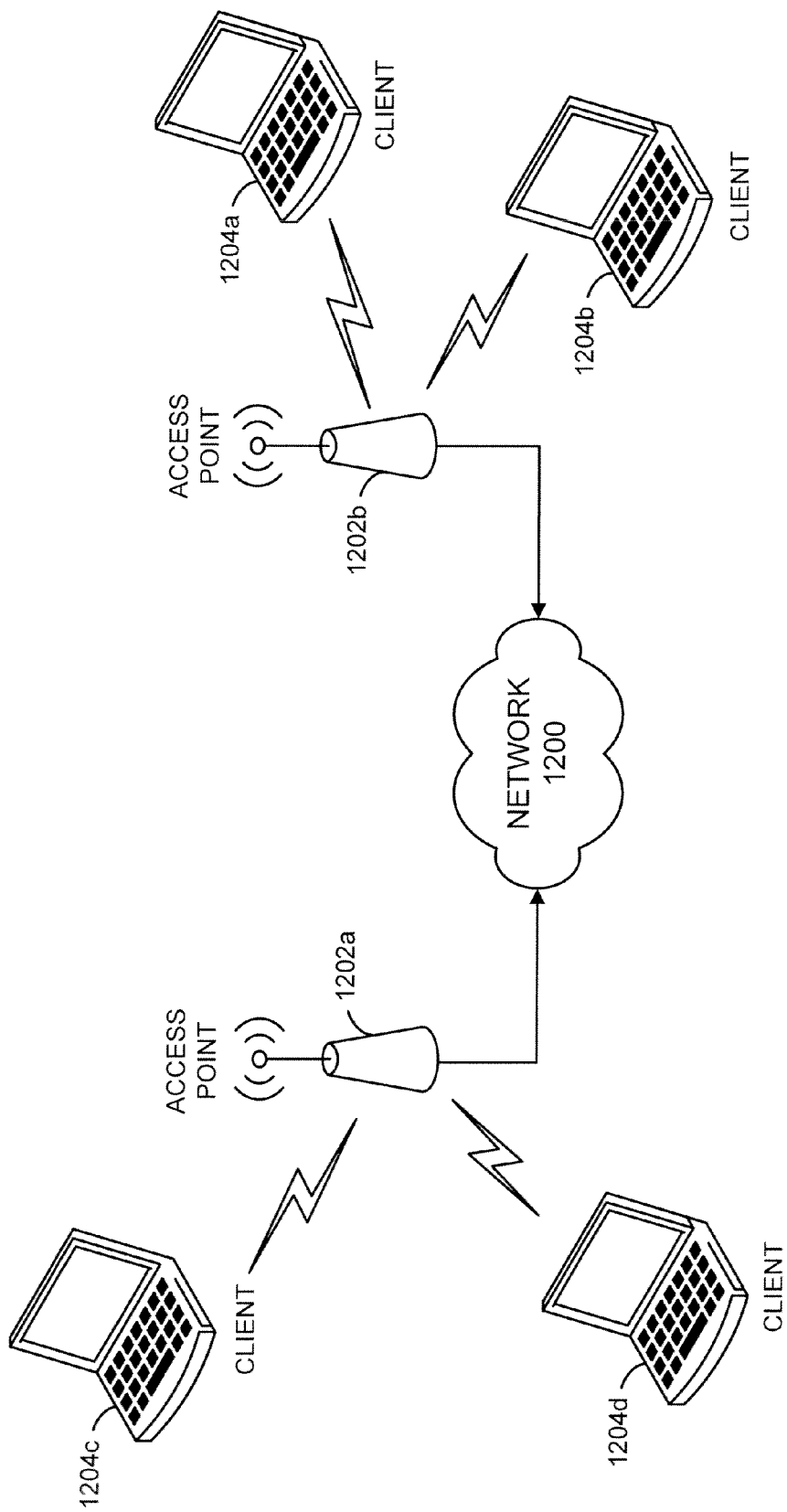
FIG. 12 is an exemplary embodiment of a network configuration for communicating data between communication devices via an access point.

Reference is now made to FIG. 12, which is an exemplary embodiment of a network configuration for communicating data between clients via an access point. As illustrated in the non-limiting example of FIG. 12, a network 1200 may be coupled to access points 1202a and 1202b. The access points 1202a and 1202b can be configured to provide wireless communications to wireless clients 1204a, 1204b, 1204c, and 1204d. Depending on the particular configuration, the clients 1204a-d may include a personal computer, a laptop computer, a mobile telephone, a Personal Digital Assistant, and/or other device configured for wirelessly sending and/or receiving data.

Depending on the particular configuration, the access points 1202a and/or 1202b may be configured for providing WIFI services, WiMAX services, wireless SIP services and/or other wireless communication services. For example, the clients 1204a-d may be configured for WIFI communications (including, but not limited to 802.11, 802.11b, 802.11a/b, 802.11g, and/or 802.11n).

Figure 13:
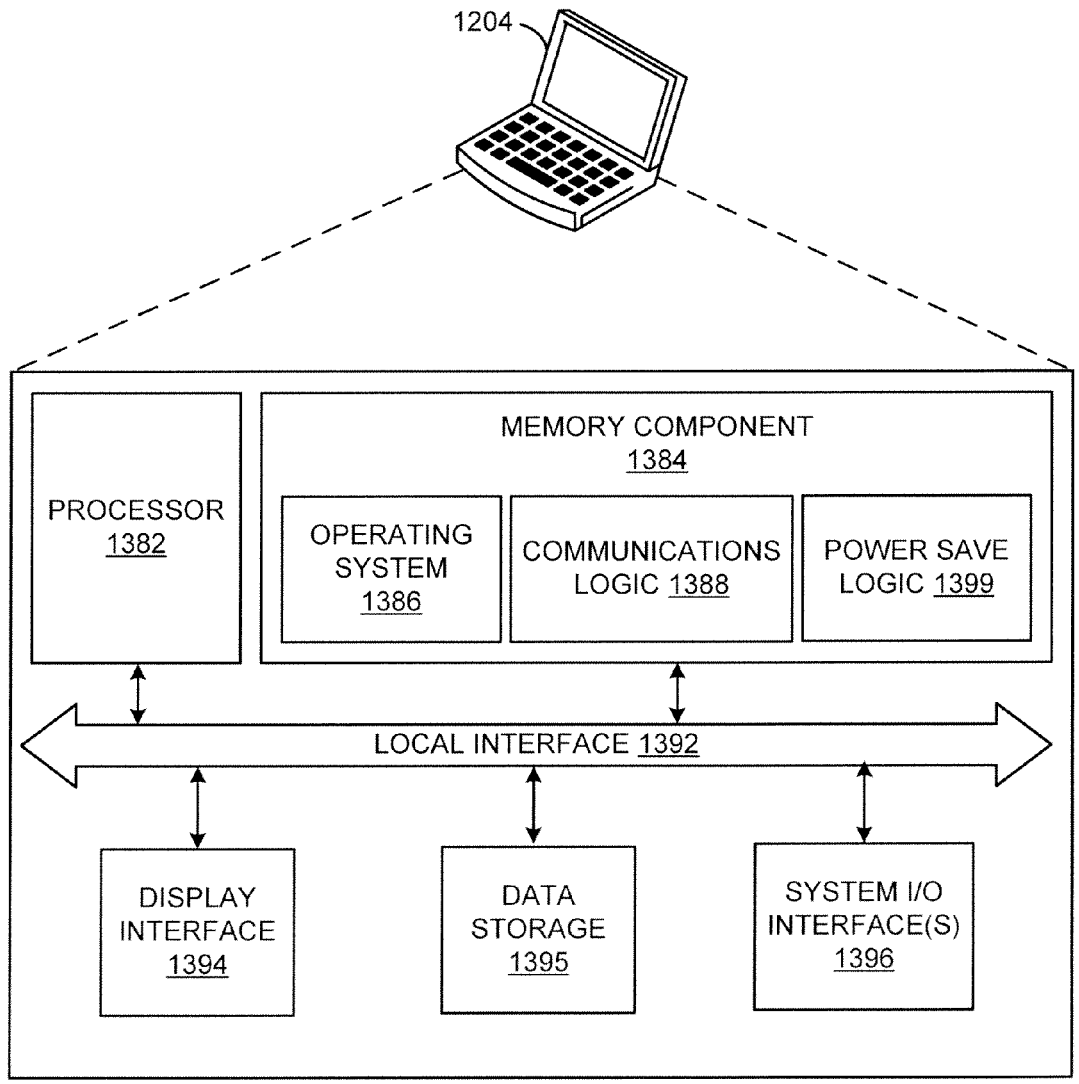
FIG. 13 is a functional block diagram illustrating a client similar to the client devices shown in FIG. 12.

FIG. 13 is a functional block diagram illustrating a client, similar to the client devices shown in FIG. 12. As illustrated in FIG. 13, the client 1204 may include a processor 1382, a memory component 1384, a display interface 1394, a data storage component 1395, and one or more input and/or output (I/O) device interface(s) 1396 that are communicatively coupled via a local interface 1392. The local interface 1392 can include, for example but not limited to, one or more buses and/or other wired or wireless connections. The local interface 1392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 1382 may be a hardware device for executing software, particularly software stored in the memory component 1384.

The processor 1382 can be any custom made or commercially available processor, a central processing unit (CPU), an auxiliary processor among several processors associated with the computing device 1204, a semiconductor based microprocessor (in the form of a microchip or chip set), a macroprocessor, or generally any device for executing instructions.

The memory component 1384 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 1384 may incorporate electronic, magnetic, optical, and/or other types of storage media. Note that the memory component 1384 can also have a distributed architecture, where various components are situated remotely from one another, but can be accessed by the processor 1382.

The software in the memory component 1384 may include one or more separate programs, each of which includes an ordered listing of executable instructions for implementing logical functions. In the example of FIG. 13, the software in the memory component 1384 may include communications logic 1388 for providing band hopping functionality, power save logic 1399, as well as an operating system 1386. Additionally, while the logic components 1386, 1388, and 1390 are each illustrated in this non-limiting example as a single piece of logic, these components can include one or more separate software, hardware, and/or firmware modules. Similarly, one or more of these logical components can be combined to provide the desired functionality. Additionally, the operating system 1386 may be configured to control the execution of other computer programs and may be configured to provide scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 1384, so as to operate properly in connection with the operating system 1386.

The Input/Output devices that may be coupled to system I/O Interface(s) 1396 may include input devices, for example but not limited to, a keyboard, mouse, scanner, microphone, camera, proximity device, receiver, etc. Further, the Input/Output devices may also include output devices, for example but not limited to, a printer, display, transmitter, etc. The Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface 1388, which is coupled to local interface 1392, can be configured to communication with a communications network, such as the network from FIG. 12.

If the client 1204 is a personal computer, workstation, or the like, the software in the memory component 1384 may further include a basic input output system (BIOS) (omitted for simplicity). The BIOS is a set of software routines that initialize and test hardware at startup, start the Operating System 1386, and support the transfer of data among the hardware devices. The BIOS is stored in ROM so that the BIOS can be executed when an access point 1202 is activated.

When the client 1204 is in operation, the processor 1382 can be configured to execute software stored within the memory component 1384, to communicate data to with the memory component 1384, and to generally control operations of the client 1204 pursuant to the software. Software in memory, in whole or in part, may be read by the processor 1382, perhaps buffered within the processor 1382, and then executed.

Figure 14:
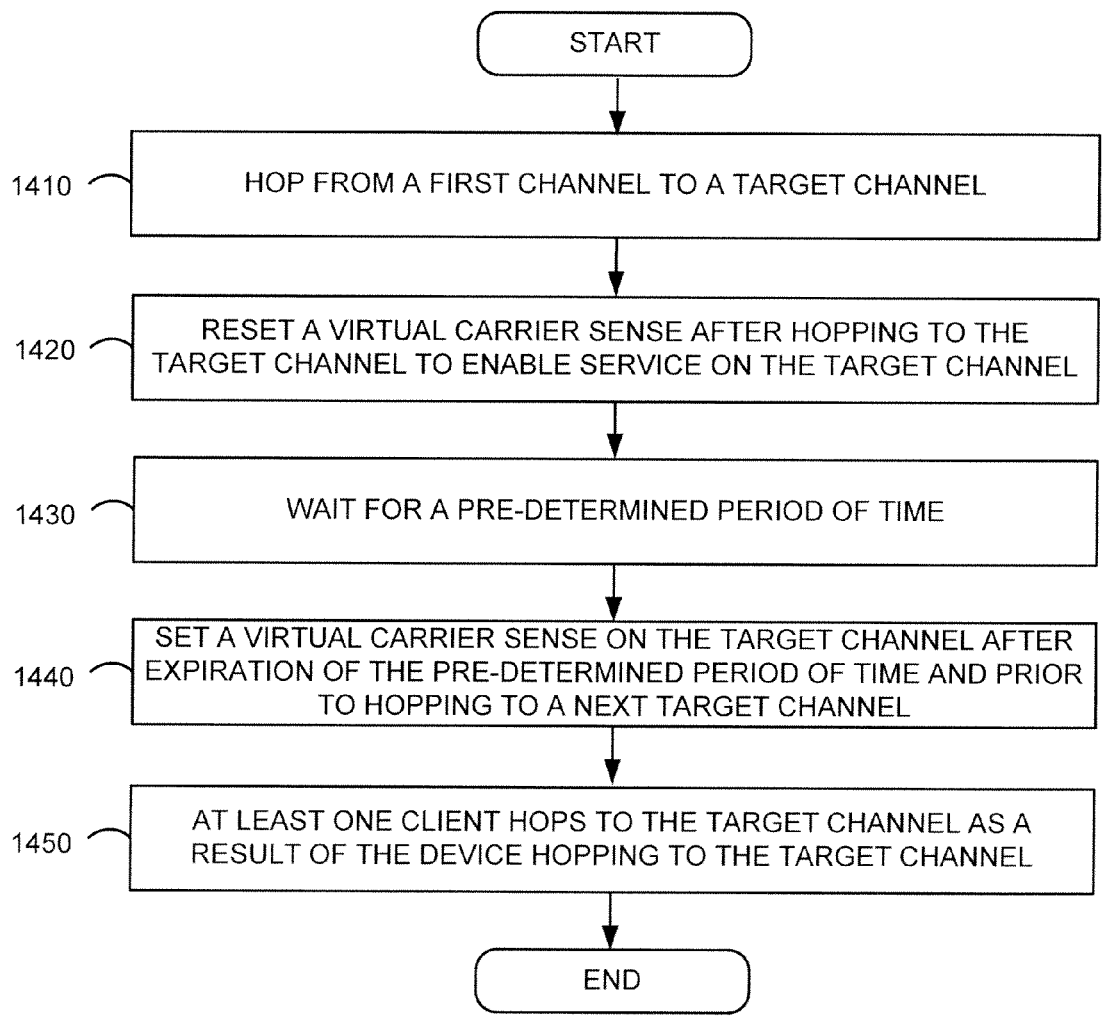
FIGS. 14-16 illustrate various embodiments of methods for band hopping in a wireless network.
Figure 15:
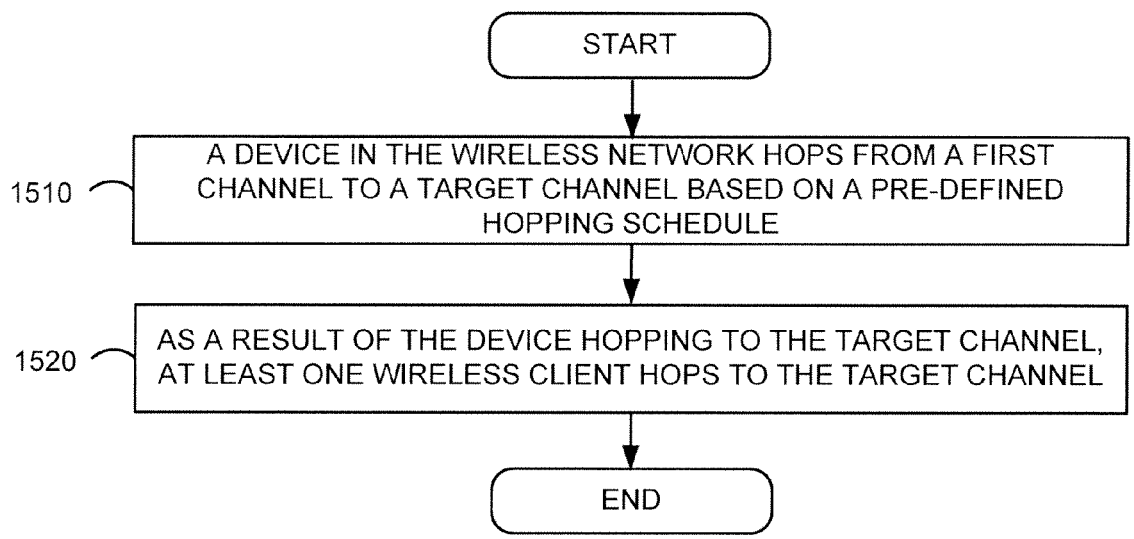

FIG. 14 is a flow diagram illustrating an embodiment of a method for band hopping in a wireless network. Beginning in step 1410, a device in a wireless network hops from a first channel to a target channel. Next, in step 1420, the device resets a virtual carrier sense after hopping to the target channel to enable service on the target channel. In step 1430, the device waits for a pre-determined period of time and then sets a virtual carrier sense on the target channel after expiration of the pre-determined period of time and prior to hopping to a next target channel (step 1440). In step 1450, at least one wireless client hops to the target channel as a result of the device hopping to the target channel, wherein the at least one wireless client is communicatively coupled to the device to form the wireless network In accordance with another embodiment, FIG. 15 is a flow diagram for band hopping in a wireless network. Beginning in step 1510, a device in the wireless network hops from a first channel to a target channel based on a pre-defined hopping schedule as described earlier. Next, in step 1520, at least one wireless client hops to the target channel as a result of the device hopping to the target channel, wherein the at least one wireless client is communicatively coupled to the device to form the wireless network.

Figure 16:
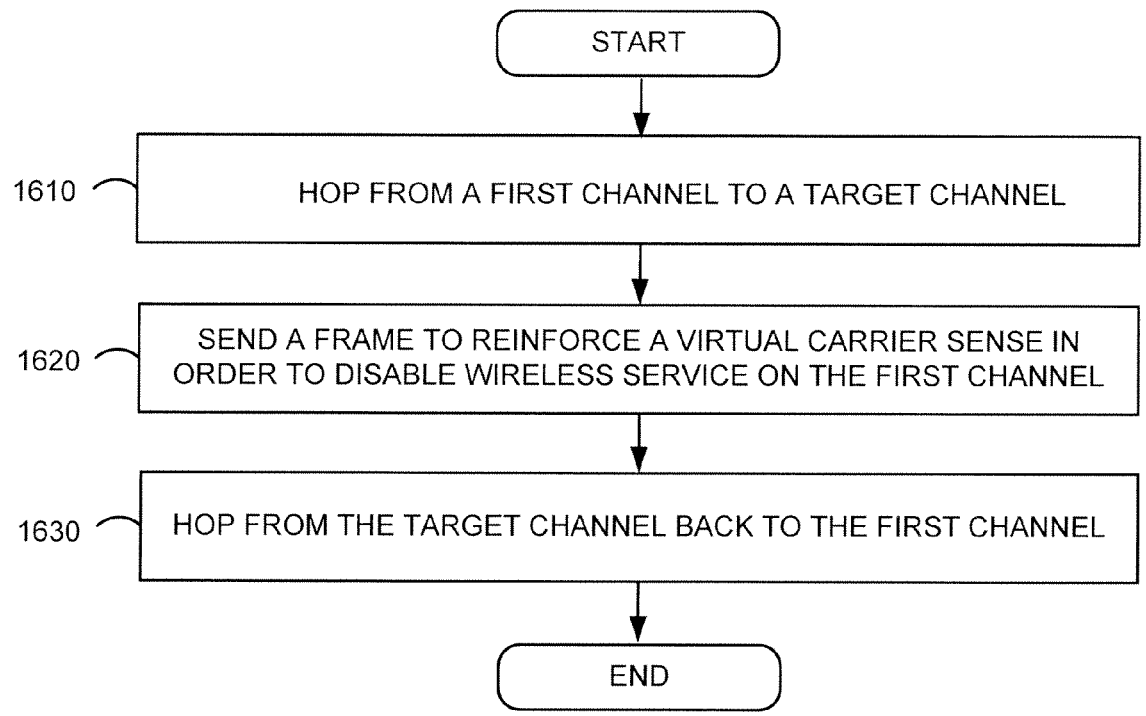

FIG. 16 is a flow diagram illustrating yet another method for band hopping in a wireless network. Beginning in step 1610, a device in the wireless network hops from a first channel to a target channel. In step 1620, the device then sends a frame to reinforce a virtual carrier sense in order to disable wireless service on the first channel. In step 1630, the device hops from the target channel back to the first channel.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method of controlling a device within a wireless network, comprising:
   sending a Power Save Multi-Poll (PSMP) frame to enable service on a target channel;
   waiting for a pre-determined period of time; and
   setting a virtual carrier sense on the target channel after expiration of the pre-determined period of time and prior to hopping to a next target channel, wherein the device sends a Broadcast Probe Response (BPR) on the target channel to assist clients scanning for the device to locate the channel in which the device is currently located.

2. The method of claim 1, wherein the BPR is transmitted with a time interval between 5 ms and 50 ms.

3. A method of controlling a device within a wireless network, comprising:
   sending a Power Save Multi-Poll (PSMP) frame to enable service on a target channel;
   waiting for a pre-determined period of time; and
   setting a virtual carrier sense on the target channel after expiration of the pre-determined period of time and prior to hopping to a next target channel;
   further comprising at least one wireless client hopping to the target channel as a result of the device hopping to the target channel, wherein the at least one wireless client is communicatively coupled to the device to form the wireless network;
   further comprising the device sending a hop indication on the first channel prior to hopping to the target channel; and
   further comprising the device sending a duplicate hop indication.

4. A method of controlling a device within a wireless network, comprising:
   sending a Power Save Multi-Poll (PSMP) frame to enable service on a target channel;
   waiting for a pre-determined period of time; and
   setting a virtual carrier sense on the target channel after expiration of the pre-determined period of time and prior to hopping to a next target channel, wherein at least one client remains in sleep mode for a time duration equal to a time duration specified in a frame separate from the PSMP frame.

5. The method of claim 4, wherein the pre-determined period of time associated with the target channel is different from a pre-determined period of time associated with a first channel.

6. The method of claim 4, wherein setting the virtual carrier sense is achieved by sending one of:
   a second PSMP frame;
   a Clear to Send (CTS) frame; or
   a hop indication frame.

7. The method of claim 4, wherein sending the PSMP frame comprises sending a frame with an N-STA field equal to 0 and a PSMP Sequence Duration field which specifies a time period in which the device is not available on the first channel.

8. The method of claim 4, wherein a time period in which the device is not available is coded in a PSMP STA info field with an STA ID equal to an association identifier (AID), wherein the AID is not associated with any clients associated with the device.

9. The method of claim 4, wherein the pre-determined period of time is determined by setting a pre-determined number of backoff slots, and wherein the number of backoff slots for the target channel is different from the first channel.

10. The method of claim 4, wherein the pre-determined period of time is a period of time during which no transmissions occur on the target channel.

11. A method of controlling a device within a wireless network, comprising:
   sending a Power Save Multi-Poll (PSMP) frame to enable service on a target channel;
   waiting for a pre-determined period of time; and
   setting a virtual carrier sense on the target channel after expiration of the pre-determined period of time and prior to hopping to a next target channel, wherein a time period in which the device is not available is coded in a PSMP STA info field with a STA_ID equal to O.

12. The method of claim 11, wherein the pre-determined period of time is a Point Coordination Function Interframe Space (PIFS) after occurrence of a Transmit Opportunity (TXOP) on the target channel during the pre-determined period of time.

13. The method of claim 11, wherein setting the virtual carrier sense is achieved by sending one of:
   a second PSMP frame;
   a Clear to Send (CTS) frame; or
   a hop indication frame.

14. The method of claim 11, wherein sending the PSMP frame comprises sending, a frame with an N-STA field equal to 0 and a PSMP Sequence Duration field which specifies a time period in which the device is not available on the first channel.

15. The method of claim 11, wherein a time period in which the device is not available is coded in a PSMP STA info field with an STA ID equal to an association identifier (AID), wherein the AID is not associated with any clients associated with the device.

16. The method of claim 11, wherein at least one client remains in sleep mode for a time duration equal to a time duration specified in a PSMP Sequence Duration field within the PSMP frame.

17. The method of claim 11, wherein the pre-determined period of time associated with the target channel is different from a pre-determined period of time associated with a first channel.

18. The method of claim 11, wherein the pre-determined period of time is determined by setting a pre-determined number of backoff slots, wherein the number of backoff slots for the target channel is different from the first channel.

19. The method of claim 11, wherein the pre-determined period of time is a period of time during which no transmissions occur on the target channel.

20. The method of claim 11, further comprising at least one wireless client hopping to the target channel as a result of the device hopping to the target channel, wherein the at least one wireless client is communicatively coupled to the device to form the wireless network.

* * * * *